May 11, 1954  F. G. PRIETO  2,677,931
UNIVERSALLY ADJUSTABLE MOTIVE UNIT FOR FLYING VEHICLES
Filed July 25, 1952
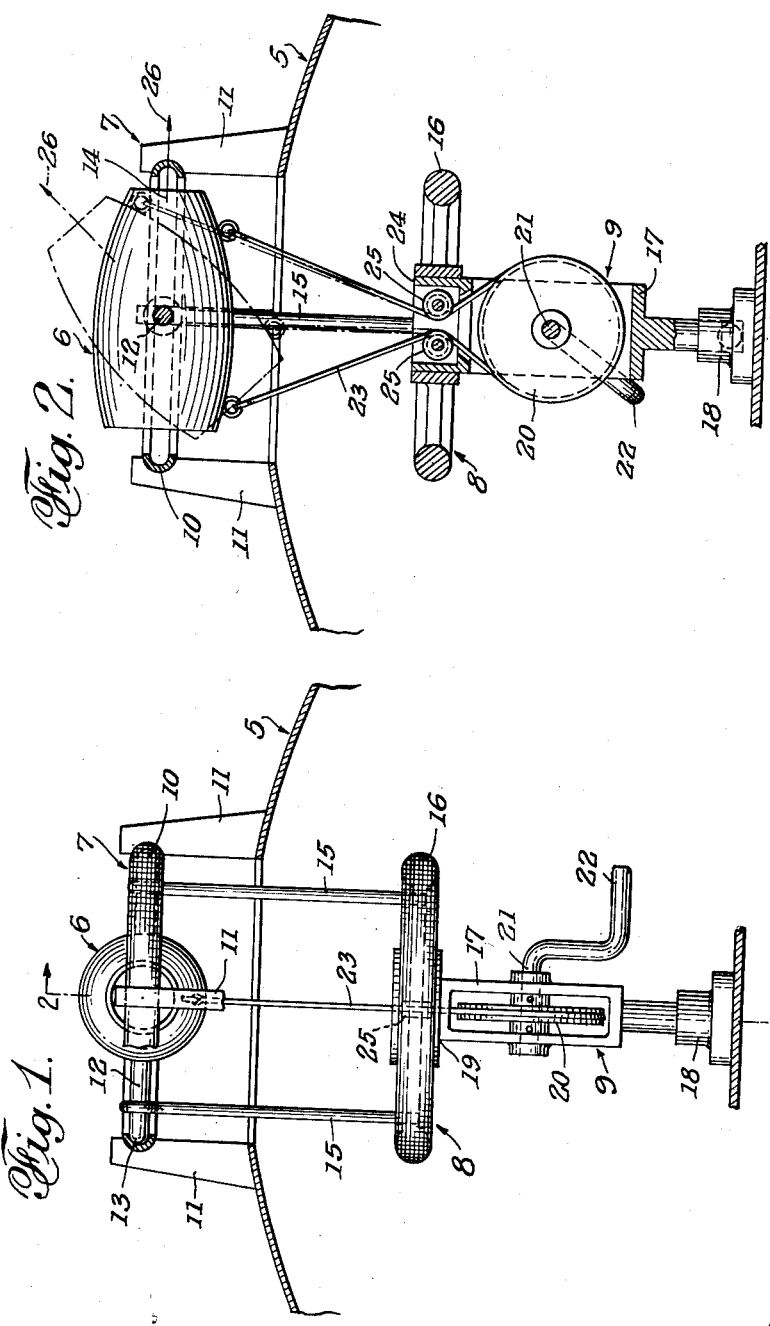
INVENTOR.
Fernando Prieto Patented May 11, 1954

2,677,931

UNITED STATES PATENT OFFICE 2,677,931

UNIVERSALLY ADJUSTABLE MOTIVE UNIT FOR FLYING VEHICLES

Fernando G. Prieto, Los Angeles, Calif.

Application July 25, 1952, Serial No. 300,920

2 Claims. (Cl. 60—35.54)

The invention relates to improvements in flying vehicles and the primary object of the invention is to provide a novel combination of a vehicle and a movement-imparting engine for said vehicle.

Another object of the invention is to so arrange the engine on the vehicle that the forces acting on the head of the engine are transmitted directly to the vehicle to propel the same in any desired direction.

A further object of the invention is to provide improved mechanism to adjust the operative position of a jet engine or comparable motor relative to a flying vehicle.

Others have disclosed auxiliary devices which can improve the dirigibility of a vehicle. The present invention contemplates the provision of a new combination of vehicle and engine that is simple, strong and efficient, and causes the vehicle to ascend or descend vertically or to move in any other desired direction.

This application is a continuation-in-part of my pending application Ser. No. 252,103, filed October 19, 1951, now abandoned.

The foregoing objects of my invention will become more clearly evident from the following description of an exemplary form of the invention, the same being illustrated in the accompanying drawing.

Fig. 1 is a front elevational view of an engine and the means embodying the present invention, the same being shown in its operative position relative to the upper portion of a vehicle propelled thereby.

Fig. 2 is a vertical sectional view as taken on the line 2—2 of Fig. 1.

The means that is illustrated comprises, generally, an aircraft 5, a jet or comparable engine 6, means 7 to interconnect said aircraft and engine, means 8 to adjust the position of the engine in a horizontal plane, and means 9 to adjust the axis of said engine in a vertical plane.

The aircraft 5 may be of any desired form and the same is intended to include vehicles generally, the intent of this invention being to provide means to propel a vehicle in any desired direction, as stated in the above preamble.

The engine 6 may be of any type that creates thrust. Examples of such an engine are jet motors and the engine disclosed in my Patent No. 2,481,872.

The means 7 comprises a circular guide track 10 disposed on a horizontal plane preferably above the upper portion of vehicle 5 and suitable supports or standards 11 fixedly connecting said track to said vehicle. As shown, track 10 is provided with a semi-circular cross-section. The means 7 further includes axles 12 that extend in opposite directions from an intermediate part of engine 6, said axles being provided with rounded ends 13 designed to slidingly fit in track 10.

The means 8 for effecting rotational adjustment of the axis 14 of engine 6 in the plane of track 10 is shown as comprising a pair of depending rods or like rigid elements 15 connected to axles 12 at one end, and a handwheel 16 connected at the other end. Said rods and handwheel are rigidly connected to constitute an adjusting frame. The handwheel is disposed in a plane below but parallel to the plane of track 10. It will be clear, therefore, that manual rotation of said handwheel, through the medium of rods 15 and axles 12, will result in comparable rotation of engine 6 in the plane of said track. It will be realized that, while not shown, suitable power means may be provided to adjust the rotational position of the handwheel.

The means 9 for effecting rotational adjustment of engine or motor 6 and its axis 14 on the axis of axles 12 comprises a vertical frame 17 that has support in a bearing 18 wherein the same may turn on a vertical axis, a fixed interconnection 19 between said frame and handwheel 16, a pulley 20 mounted in frame 17 on an axle 21, a hand crank 22 on the latter axle, and a wire or cable 23 connected to the engine on opposite sides of axles 12 and trained around pulley 20.

Frame 17 is provided with an extension 24 by means of which it is affixed to handwheel 16 and said extension mounts guide pulleys 25 over which wire 23 is trained to obtain substantial encirclement of pulley 20 by said wire. It will be seen that crank 22 may be used to tip engine 6 on the axis of axles 12.

Engine 6 creates a reaction force in the direction of arrow 26. Therefore, the vehicle is subject to said reaction force and is bodily urged in the same direction according to the adjusted angular and/or horizontal direction of the line of thrust.

Since variations of the present means can well be made within the concept of the invention, I wish to reserve to myself all modifications thereof that may fall within the scope of the appended claims.

I claim:

1. In a vehicle, support and guide means including a circular track fixedly connected to the vehicle, a longitudinally arranged reaction engine disposed in encircled position within said track, oppositely extending axles having their ends slidingly engaged in the track and mounting the engine for pivotal movement on the axis of said axles, said axles being transverse to the line of thrust of the engine and subject to the thrust thereon, means connected to the engine to adjust the angular position thereof on the axis of the axles, and means connected to the axles to bodily turn the same in the track and thereby turn the engine to adjust the direction of the thrust.

2. In a vehicle according to claim 1: both adjusting means being disposed below the engine, and the means to turn the engine in the track being carried by the means to adjust the angular position of the engine on said axles.

References Cited in the file of this patent

UNITED STATES PATENTS

| Number | Name | Date |
|---|---|---|
| 1,842,125 | Schwarz | Jan. 19, 1932 |
| 2,214,656 | Briggs | Sept. 10, 1940 |
| 2,605,606 | Pilz | Aug. 5, 1952 |
| 2,621,871 | Robert | Dec. 16, 1952 |
| 2,639,582 | Pearlman | May 26, 1953 |